(12) United States Patent
Solar et al.

(10) Patent No.: US 11,833,972 B1
(45) Date of Patent: Dec. 5, 2023

(54) VEHICLE OVERHEAD CONSOLE WITH COOLING FAN

(71) Applicant: Magna Mirrors Holding GmbH, Sailauf (DE)

(72) Inventors: Martin Solar, Erlenbach (DE); Christopher H. Curtis, Frankfurt am Main (DE)

(73) Assignee: Magna Mirrors Holding GmbH, Sailauf (DE)

( * ) Notice: Subject to any disclaimer, the term of this patent is extended or adjusted under 35 U.S.C. 154(b) by 0 days.

(21) Appl. No.: 18/315,594

(22) Filed: May 11, 2023

Related U.S. Application Data

(60) Provisional application No. 63/365,512, filed on May 31, 2022, provisional application No. 63/364,658, filed on May 13, 2022.

(51) Int. Cl.
   *B60R 1/12* (2006.01)
   *B60R 1/04* (2006.01)
   *B60R 11/04* (2006.01)
   *B60R 11/00* (2006.01)

(52) U.S. Cl.
   CPC .......... *B60R 1/12* (2013.01); *B60R 1/04* (2013.01); *B60R 11/04* (2013.01); *B60R 2001/1253* (2013.01); *B60R 2011/0026* (2013.01)

(58) Field of Classification Search
   CPC ..... B60R 2001/1253; B60R 2011/0026; B60R 1/12; B60R 1/04; B60R 11/04
   See application file for complete search history.

(56) References Cited

U.S. PATENT DOCUMENTS

| | | | |
|---|---|---|---|
| 6,690,268 B2 | 2/2004 | Schofield et al. | |
| 6,824,281 B2 | 11/2004 | Schofield et al. | |
| 7,038,577 B2 | 5/2006 | Pawlicki et al. | |
| 7,480,149 B2 | 1/2009 | DeWard et al. | |
| 7,720,580 B2 | 5/2010 | Higgins-Luthman | |
| 7,855,755 B2 | 12/2010 | Weller et al. | |
| 8,256,821 B2 | 9/2012 | Lawlor et al. | |
| 9,487,159 B2 | 11/2016 | Achenbach | |
| 9,596,387 B2 | 3/2017 | Achenbach et al. | |
| 9,871,971 B2 | 1/2018 | Wang et al. | |
| 9,896,039 B2 | 2/2018 | Achenbach et al. | |
| 9,910,343 B2* | 3/2018 | Carlson | H04N 23/51 |
| 11,019,749 B2* | 5/2021 | Yen | G01S 7/497 |
| 11,290,622 B2* | 3/2022 | Solar | H04N 23/52 |

(Continued)

*Primary Examiner* — Arman B Fallahkhair
(74) *Attorney, Agent, or Firm* — HONIGMAN LLP

(57) ABSTRACT

A vehicular windshield electronics module includes a housing configured to attach at an interior portion of a vehicle. The housing includes a front portion extending along a windshield of the vehicle and a rear portion extending along a roof of the vehicle. The housing accommodates a camera at the front portion of the housing. The camera generates heat within the housing. Electronic circuitry at the rear portion of the housing generates heat within the housing. An interior rearview mirror assembly includes a mirror head mounted at the housing and at least one electronic component generates heat within the mirror head. An electrically operable fan generates cooling air within the housing. Ducts are formed through the housing so that air flow may pass into and out from the housing. To dissipate heat, the air flow from the fan passes along the camera, along the electronic circuitry and along the mirror head.

28 Claims, 3 Drawing Sheets

(56) References Cited

U.S. PATENT DOCUMENTS

| | | | |
|---|---|---|---|
| 11,700,439 B2* | 7/2023 | Skrocki | H04N 23/54 |
| | | | 348/148 |
| 2002/0126453 A1 | 9/2002 | Ubukata | |
| 2005/0213960 A1* | 9/2005 | Baldwin | G03B 17/02 |
| | | | 396/439 |
| 2015/0342091 A1 | 11/2015 | Scharinger et al. | |
| 2016/0119509 A1* | 4/2016 | Wato | G03B 17/55 |
| | | | 348/148 |
| 2017/0064877 A1 | 3/2017 | Ratcliffe | |
| 2017/0113611 A1 | 4/2017 | Thompson et al. | |
| 2017/0129404 A1 | 5/2017 | Oda | |
| 2017/0131621 A1 | 5/2017 | Tang et al. | |
| 2017/0182944 A1 | 6/2017 | Achenbach et al. | |
| 2017/0184945 A1 | 6/2017 | Carlson | |
| 2019/0124238 A1 | 4/2019 | Byrne et al. | |
| 2019/0124243 A1 | 4/2019 | Mleczko et al. | |
| 2019/0306966 A1 | 10/2019 | Byrne et al. | |
| 2020/0137926 A1 | 4/2020 | Wohlte | |
| 2020/0148137 A1 | 5/2020 | Cordeiro | |
| 2020/0154020 A1 | 5/2020 | Byrne et al. | |
| 2021/0306538 A1* | 9/2021 | Solar | H04N 23/52 |
| 2021/0382375 A1* | 12/2021 | Sesti | H04N 23/57 |
| 2022/0239817 A1* | 7/2022 | Kasarla | B60K 35/00 |
| 2022/0373762 A1* | 11/2022 | Skrocki | G03B 17/12 |

* cited by examiner

VEHICLE OVERHEAD CONSOLE WITH COOLING FAN

CROSS REFERENCE TO RELATED APPLICATIONS

The present application claims the filing benefits of U.S. provisional application Ser. No. 63/365,512, filed May 31, 2022, and U.S. provisional application Ser. No. 63/364,658, filed May 13, 2022, which are hereby incorporated herein by reference in their entireties.

FIELD OF THE INVENTION

The present invention relates generally to a vehicle overhead console for a vehicle and, more particularly, to a vehicle overhead console that includes electronic content.

BACKGROUND OF THE INVENTION

Use of imaging sensors in vehicle imaging systems is common and known. Examples of such known systems are described in U.S. Pat. Nos. 9,896,039; 9,871,971; 9,596,387 and/or 9,487,159, which are hereby incorporated herein by reference in their entireties. Heat is generated during operation of the cameras, and heat dissipating fins or cooling fans or the like are typically used to dissipate heat.

SUMMARY OF THE INVENTION

A windshield electronics module for a vehicular vision system includes a camera mounted proximate to a windshield of a vehicle and an interior mirror that is mounted proximate to the windshield and the camera. An overhead console is disposed within a headliner of the vehicle, and the headliner includes a lower windshield region and a rear region. A cooling assembly is mounted at one of the lower windshield region or the rear region of the headliner and includes a plurality of ducts that direct air flow along and around each of the camera, the interior mirror, and the overhead console. The camera and the interior mirror are mounted proximate to the lower windshield region of the headliner, and the overhead console is proximate to or integrated in the headliner.

In some examples, a windshield electronics module for a vehicular vision system includes a housing or compartment configured to attach at an interior portion of a vehicle equipped with the vehicular vision system. The housing accommodates a camera and electronic circuitry of an overhead console at an interior of the housing. The camera, with the housing attached at the interior portion of the vehicle, is disposed at a front portion of the interior of the housing and views forward of the vehicle through a windshield of the vehicle. When the camera is operated to capture image data, the camera generates heat at the interior of the housing. The electronic circuitry of the overhead console is disposed at a rear portion of the interior of the housing, and the electronic circuitry includes at least one heat generating electronic component that generates heat at the interior of the housing when electrically operated. An interior rearview mirror assembly includes a mirror head that is adjustably mounted at mounting structure, and the mounting structure is attached at the housing so that the mirror head is at an exterior the housing. The interior rearview mirror assembly includes at least one heat generating electronic component that, when electrically operated, generates heat within the mirror head. An electrically operable fan generates cooling air flow at the interior of the housing when electrically operated. The housing includes one or more ducts formed through an outer surface of the housing and fluidly connecting the interior and the exterior of the housing so that air flow may pass between the interior and the exterior of the housing. When the electrically operable fan is electrically operated to generate the cooling air flow, air flow passes along the camera within the front portion of the interior of the housing to dissipate heat generated by the camera, along the electronic circuitry of the overhead console at the rear portion of the interior of the housing to dissipate heat generated by the at least one heat generating electronic component of the electronic circuitry and along the mirror head at the exterior of the housing to dissipate heat generated by the at least one heat generating electronic component of the interior rearview mirror assembly.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
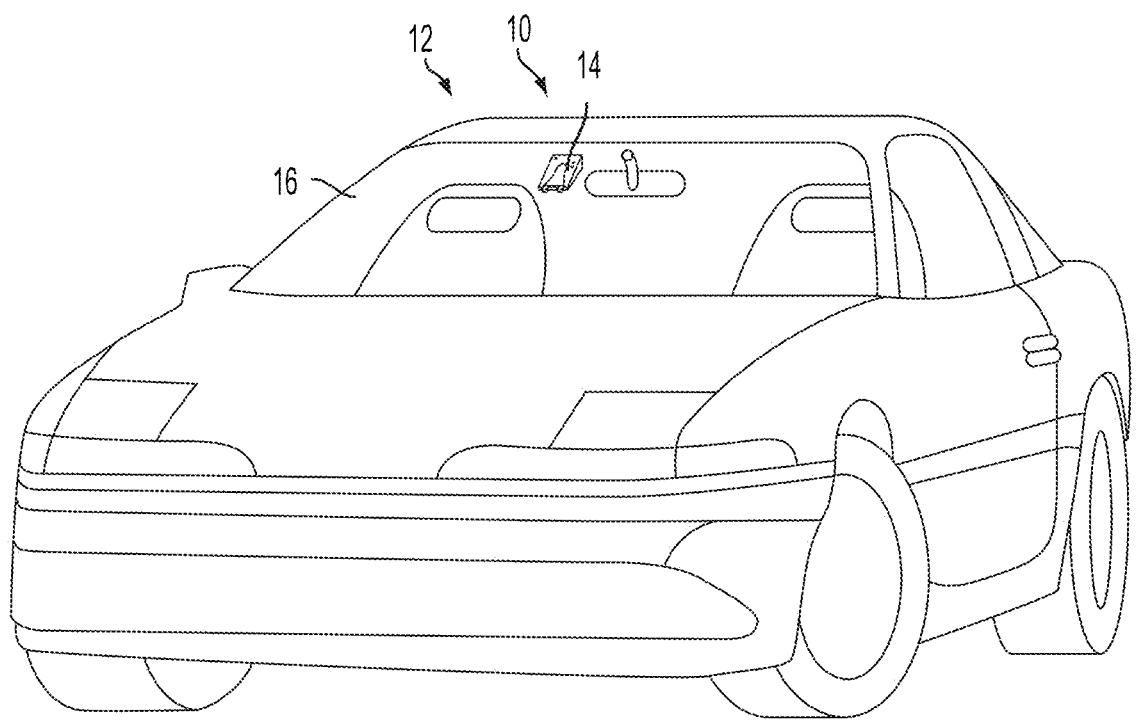
FIG. 1 is a perspective view of a vehicle with a vision system that incorporates a windshield mounted forward viewing camera module.

Referring now to the drawings and the illustrative embodiments depicted therein, a vision system 10 for a vehicle 12 includes at least one exterior viewing imaging sensor or camera 14, such as a forward viewing imaging sensor or camera, which may be disposed at and behind the windshield 16 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU), which includes circuitry and associated software, with the circuitry including a processor that is operable to process image data captured by the camera or cameras for detecting objects or the like and/or providing displayed images at a display device for viewing by the driver of the vehicle. The data transfer or signal communication from the camera to the ECU may comprise any suitable data or communication link, such as a vehicle network bus or the like of the equipped vehicle.

Figure 2:
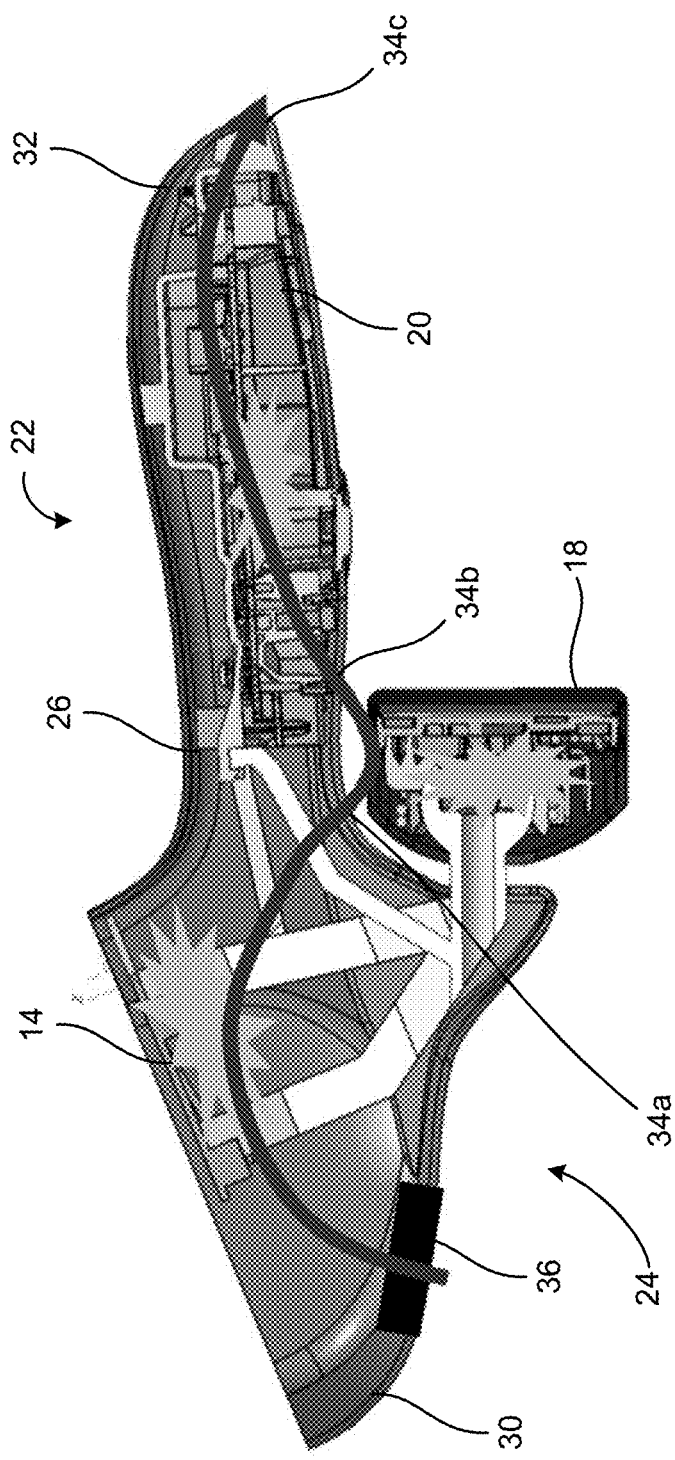
FIG. 2 is a cross-sectional view of an electronics module with a cooling assembly mounted at an upper windshield region.
Figure 3:
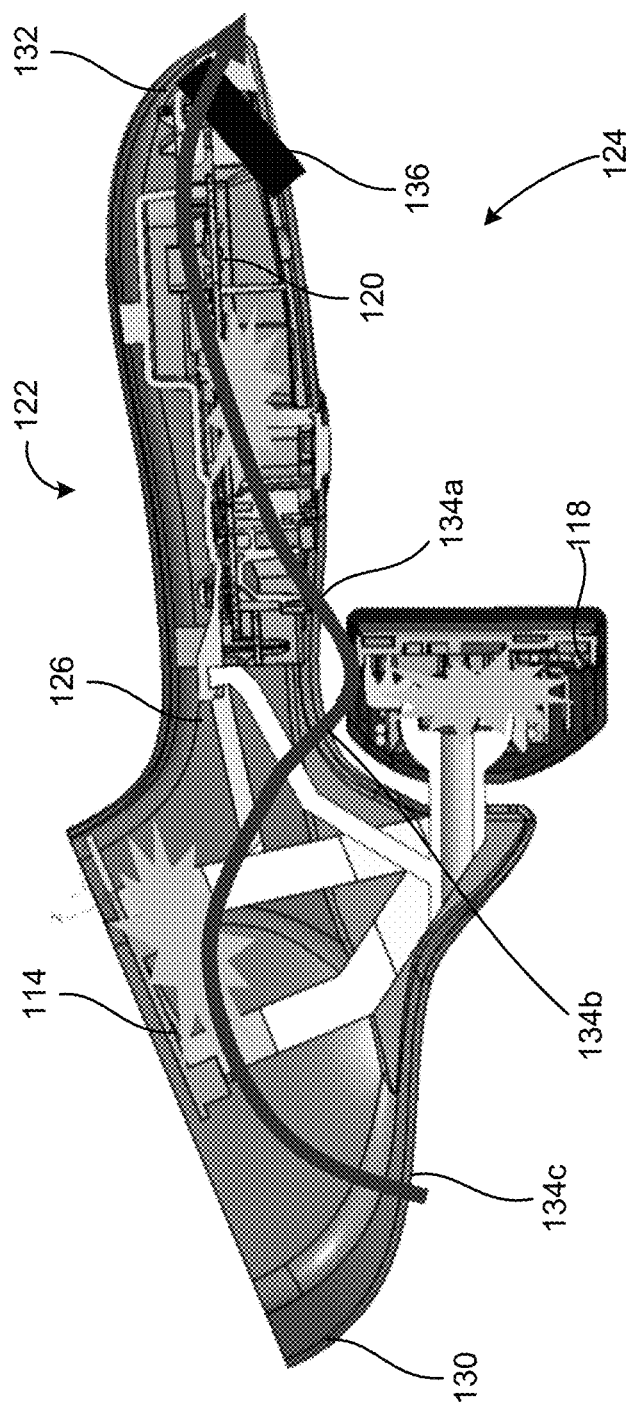
FIG. 3 is a cross-sectional view of an electronics module with a cooling assembly mounted at a rear region.

As shown in FIGS. 2 and 3, the vehicle 12 also includes an interior rearview mirror assembly 18 proximate to the camera 14 and an overhead console 20 proximate the interior mirror 18. For example, the forward viewing camera 14, the interior rearview mirror 18 and/or the overhead console module 20 may be packaged as a singular unit that is mounted to the interior portion of the vehicle (such as the interior side of the vehicle windshield and/or the headliner of the vehicle cabin). Collectively, the camera 14, the interior mirror 18, and the overhead console 20 may be referred to as an electronics module 22. Heat is generated during operation of the electronic components of the electronics module 22 (e.g., a processor of the camera, a video display screen in the mirror head, and/or other components of a driver monitoring system within the mirror head, and the like), such that, without enhanced cooling, maximum operating temperatures at the camera 14, interior mirror 18, overhead console 20, and/or associated electronics may be exceeded or functionality may be partially or completely deactivated or degraded at hot ambient temperatures. For instance, an imager semiconductor junction temperature has to be below a threshold temperature to ensure necessary image quality. The electronics module 22 includes an integrated active cooling assembly 24 that is attached proximate to at least one of the camera 14 and the overhead console 20 within a compartment or housing 26 of the electronics module 22. The cooling assembly 24 (which includes one or more electrically operable fans 36) operates to force air through the compartment 26 of the electronics module 22 to enhance cooling of the camera 14, the interior mirror 18, and the overhead console 20 during operation of the electronic components. Air flow may be directed through the compartment 26 by the one or more fans 36 of the cooling assembly 24 that operate to direct air flow through the compartment and/or to draw air flow through the compartment, as discussed further below.

The camera 14 includes an imager circuit board having an imager thereat. The camera 14 may also include a main or principle or primary circuit board, with the primary circuit board including an image processor that processes image data captured by the camera (with the imager circuit board being electrically connected to the main circuit board via a flexible connector, such as a flexible ribbon cable or the like, whereby image data captured by the camera is provided to the primary or main circuit board via the flexible connector). Because of the amount of heat typically generated by the circuitry of the circuit boards during operation of the camera (and particularly the heat generated by the image processor of the primary circuit board during operation of the camera), the cooling assembly 24 (e.g., one or more of the electrically operable fans 36 of the cooling assembly 24) may be disposed proximate to the camera 14 such that, when an electrically powered motor of the cooling assembly 24 is electrically powered, the electrically powered motor rotatably drives a plurality of fan blades about an axis of rotation such that the cooling assembly 24 directs air flow toward the camera 14 and cooling air flow passes onto and along the camera 14.

Similarly, the interior mirror 18 may include a video display screen, an in-cabin monitoring camera, various sensors, and/or associated electronics, which also generate heat during operation. For example, the interior mirror 18 may include a video display screen that displays video images derived from image data captured by a rearward viewing camera of the vehicle, such as the rear backup camera of the vehicle. The heat generating electronic components associated with the interior mirror 18 may be disposed at and/or within the mirror head of the mirror assembly 18 and/or the electronic components may be disposed at least partially within the compartment 26 of the electronics module 22.

The overhead console 20 may include overhead lighting components, radar sensors, cameras for in-cabin monitoring, and/or an actuation feature (e.g., motors or drivers) for operating an overhead light transmitting panel (e.g., a sunroof, moonroof, solar shade, and the like), such that the each of these components associated with the overhead console 20 may generate heat during operation. Stated differently, operating the lighting components and/or the actuation feature generates heat within the compartment 26 of the electronics module 22 proximate to the overhead console 20, which may accumulate within the space defined by the compartment 26 of the electronics module 22 when the cooling assembly 24 is not operated.

Referring to FIGS. 2 and 3, the cooling assembly 24 may be disposed at a lower region 30 (FIG. 2) or a rear region 32, 132 (FIG. 3) of the compartment 26 of the electronics module 22. That is, one or more fans 36 of the cooling assembly 24 may be disposed at the lower region 30 and/or the rear region 32. The cooling assembly 24 directs cooling air across the camera 14, the interior mirror 18, and/or the overhead console 20. The cooling assembly 24 includes respective ducts 34 to direct and/or draw the air accordingly. For example, as illustrated in FIG. 2, the fan 36 of the cooling assembly 24 is positioned at the lower region 30 (FIG. 2) and, when operated, directs air toward the rear region 32 of the compartment 26. The cooling assembly 24 includes a plurality of ducts 34a-34c that assist in circulating the cooling air from the cooling assembly 24 within the compartment 26 of the electronics module 22 and about one or more of the camera 14, the interior mirror 18, and the overhead console 20.

For example, and such as shown in FIG. 2, the cooling assembly 24 may, when the motor of the cooling assembly 24 is electrically powered, draw air in to the compartment 26 at the lower region 30 and circulate or direct the cooling air in the module toward and past the camera 14 so as to pass through a first duct 34a and toward an upper portion of the mirror head. The camera module 14 is disposed between the first duct 34a and the fan 36 of the cooling assembly 24. The cooling assembly 24 thus directs the cooling air from the lower region 30, and the cooling air passes toward and generally parallel along the camera 14, and exits the compartment 26 through the first duct 34a, which may be above and behind the interior mirror 18.

A second duct 34b may be spaced from the first duct 34a and on the opposite side of the interior mirror 18 from the first duct 34a so that air may be drawn or directed into the compartment 26 and away from the interior mirror through the second duct 34b. For example, a fan may be positioned at or near the second duct 34b. Stated differently, the cooling air moves along the camera 14 and out the first duct 34a above and behind the interior mirror 18 and is drawn back through the compartment 26 of the electronics module 22 via the second duct 34b. The second duct 34b may be disposed above and in front of the interior mirror 18. The first and second ducts 34a, 34b cooperate to circulate the cooling air about the interior mirror 18, while the first duct 34a also draws the cooling air past the camera 14.

The second duct 34b draws air (which may include the cooling air exiting from the first duct 34a) into the compartment 26 of the electronics module 22 and directs the air toward a third duct 34c. The third duct 34c may be positioned at the rear region 32 proximate to the overhead console 20. The air flows from the second duct 34b, along and/or through and around the overhead console 20, where the air may at least partially exit the compartment 26 of the electronics module 22 through the third duct 34c. Optionally, the cooling air may circulate within the compartment 26 of the electronics module 22 to cool or otherwise promote air circulation among other components within the compartment 26 of the electronics module 22. Thus, the cooling assembly 24 dissipates heat from the compartment 26 by directing air flow from the lower region 30 of the compartment 26 toward the rear region 32. As the air flow moves along and around the electronic components within the compartment 26, heat is dissipated from the electronic components and the heated air flow exits the compartment 26 to promote a cooled environment for the electronic components within the compartment 26. Optionally, the cooling assembly 24 may draw air toward the lower region 30, such that air flow is drawn through the one or more ducts and from the rear region 32 toward the lower region 30 where the heated air is expelled from the compartment 26 via the fan 36.

With reference to FIG. 3, a cooling fan 136 of a cooling assembly 124 is disposed at a rear region 132 of a compartment 126 of an electronics module 122. In this configuration, a first duct 134a is positioned above and in front of an interior mirror 118 and a third duct 134c is positioned at the lower region 130 with a second duct 134b positioned therebetween (such as above and behind the interior mirror). The cooling air may be directed from the cooling assembly 124 at the rear region 132 toward and over and/or around the overhead console 120 and through the first duct 134a above and in front of the interior mirror 118. The cooling air may exit the first duct 134a proximate to the interior mirror 118, pass over and along the interior mirror 118, and re-enter the compartment 126 of the electronics module 122 at the second duct 134b. This circulates the cooling air about the interior mirror 118 to cool the electronic components disposed thereat. After re-entering the compartment 126 of the electronics module 122 at the second duct 134b, the cooling air circulates proximate to the camera 114 and may exit the compartment 126 of the electronics module 122 at the third duct 134c at the lower region 130.

Thus, the fan 136 at the rear region 132 of the compartment 126 directs cooling air toward the overhead console 120 and the first duct 134a. Structure of the compartment 126 may cooperate with the first duct 134a to guide the cooling air through the first duct 134a and toward the interior mirror 118 and the second duct 134b. Thus, the cooling air passes from the first duct 134a over and along the interior mirror 118 and into the compartment 126 through the second duct 134b. Structure of the compartment 126 and the second duct 134b may cooperate to guide the cooling air toward the camera 114 and the third duct 134c such that the cooling air passes from the second duct 134b over and along the camera 114 and out of the compartment 126 through the third duct 134c. Thus, the cooling assembly 124 dissipates heat from the compartment 126 by directing air flow from the rear region 132 of the compartment 126 toward the lower region 130.

Optionally, the fan 136 at the rear region 132 may draw air through the compartment 126 from the lower region 130 and toward the rear region 132, such that the air flow passes through the third duct 134c, over and along the camera 114, through the second duct 134b, over and along the interior mirror 118, through the first duct 134a, and over and along the overhead console 120 toward the fan 136. Operation of the fan 136 may create a vacuum effect at the ducts 134 to draw air into and through the compartment 126 and the fan 136 may expel heated air at the rear region 132. In this configuration, the cooling fan 136 is in a sucking configuration, such that the cooling fan 136 sucks or otherwise draws air through the compartment 126 of the electronics module 122 (i.e., from the front of the vehicle and toward the rear of the vehicle).

The fan of the cooling assembly may include any suitable air flow generating device, such as, for example, a low profile cooling fan. While depicted at the lower region (FIG. 2) and the rear region (FIG. 3) of the compartment, the cooling fan may be disposed at any practicable location within the compartment to maximize the cooling efficiency for each of the camera, the interior mirror, and the overhead console. The plurality of ducts assist in the maximized cooling efficiency by promoting internal circulation within the compartment to draw the cool air from the cooling fan toward and around each of the camera, the interior mirror, and the overhead console.

Optionally, the cooling assembly may include a self-contained unit or module that includes the motor, fan blades, housing, and the exit ducts. The size and shape of the cooling assembly is selected based at least in part on the size and shape of the camera, the interior mirror, and the overhead console. The air flow generated or output by the fan assembly may be at a flow rate of at least 0.7 cubic feet per minute (CFM). The design and configuration of the fan and cooling assembly can be adapted to provide desired flow rates at and along and between the respective camera, interior mirror, and/or overhead console.

As shown in FIGS. 2 and 3, the plurality of ducts of the cooling assembly have their openings proximate to each of the respective heat generating elements, such that the air that is directed or drawn by the fan flows into and along and between the heat generating elements (i.e., the interior mirror, the camera, and the overhead console). In the illustrated embodiment of FIGS. 2 and 3, the cooling assembly is configured to direct air so that air is directed or drawn into a flow path defined at least in part by the plurality of ducts. Optionally, however, the cooling assembly may be configured to direct air into one or more other air flow paths defined within the compartment.

Optionally, the compartment may be at least partially integrated with the headliner or roof panel of the vehicle, such that the headliner extends over and along at least a portion of the compartment. One or more of the ducts may be disposed at an outer surface of the headliner. Thus, the compartment may be at least partially hidden or rendered covert by the headliner of the vehicle, with the ducts, interior mirror, and/or one or more user inputs associated with the overhead console exposed at or through the headliner. Further, the headliner may provide sound dampening for operation of the fan within the compartment.

The cooling fan motor may comprise a variable speed fan motor that is controlled, e.g., by the control or controller or electronic control unit (ECU) or processor or the like, with a pulse-width modulation (PWM) line. The controller includes control circuitry and associated software. The PWM duty cycle may be software (SW) controlled, based on one or more inputs, such as, for example, an input based on an output of a vehicle ambient temperature sensor (that provides a temperature at or near or indicative of the temperature at the camera module), an input based on an output of a vehicle ambient light sensor (to detect sunload and thus to provide an output that is indicative of temperature at the windshield and camera module), and an input based on an output of one or more internal temperature sensors at more critical components. For example, the cooling assembly may be operated to cool the interior of the compartment based on a temperature sensor indicating that the temperature at the interior of the compartment is greater than a threshold temperature (which may be based on a maximum operating temperature of the one or more electronic components), such as greater than 100 degrees Fahrenheit, greater than 120 degrees Fahrenheit, greater than 140 degrees Fahrenheit, and the like. The fan may operate only with the necessary load and speed, in order to improve lifetime requirements based on targeted device under test (DUT) thermal mission profile.

Optionally, other cooling elements or devices may also or otherwise be implemented to cool the electronic components during operation. For example, a Peltier element may be disposed at one or more components to increase thermal dissipation. Optionally, the camera module may include integrated liquid cooling to enhance heat dissipation away from the camera module. Optionally, one or more heat sinks may be disposed at and/or aligned with one or more of the heat generating electronic components, with the air flow moving through and along fins of the heat sink to dissipate heat more efficiently from the electronic component. Optionally, a cooling fan assembly may be disposed in the vehicle separate from the camera module, whereby a channel or duct guides and directs air flow from the separate cooling fan assembly to the camera module.

The camera comprises a forward viewing camera, such as disposed at the windshield, and optionally at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular windshield electronics module, the vehicular windshield electronics module comprising:
   a housing configured to attach at an interior portion of a vehicle equipped with the vehicular windshield electronics module, wherein the housing accommodates a camera, and wherein, with the housing attached at the interior portion of the vehicle, the housing includes a front portion extending partially along an in-cabin side of an upper region of a windshield of the vehicle and a rear portion rearward of the front portion and extending partially along a roof portion of an interior cabin of the vehicle;
   wherein the camera is disposed at the front portion of the housing and, with the housing attached at the interior portion of the vehicle, views forward of the vehicle through the upper region of the windshield of the vehicle, and wherein the camera, when operated to capture image data, generates heat within the housing;
   wherein electronic circuitry is disposed at the rear portion of the housing, and wherein the electronic circuitry comprises at least one heat generating electronic component that, when electrically operated, generates heat within the housing;
   an interior rearview mirror assembly disposed at the housing, the interior rearview mirror assembly comprising a mirror head;
   wherein the interior rearview mirror assembly comprises at least one heat generating electronic component that, when electrically operated, generates heat within the mirror head;
   wherein the housing comprises a plurality of ducts;
   an electrically operable fan that, when electrically operated, generates cooling air flow within the housing, wherein the air flow passes into the housing and out from the housing via respective ducts of the plurality of ducts; and
   wherein, when the electrically operable fan is electrically operated to generate the cooling air flow, air flow passes (i) along the camera at the front portion of the housing to dissipate heat generated by the camera, (ii) along the electronic circuitry at the rear portion of the housing to dissipate heat generated by the at least one heat generating electronic component of the electronic circuitry and (iii) along the mirror head to dissipate heat generated by the at least one heat generating electronic component of the interior rearview mirror assembly.

2. The vehicular windshield electronics module of claim 1, wherein the plurality of ducts includes (i) a first duct at the front portion of the housing and (ii) a second duct at the rear portion of the housing.

3. The vehicular windshield electronics module of claim 2, wherein the mirror head is disposed at the housing between the first duct and the second duct.

4. The vehicular windshield electronics module of claim 3, wherein the plurality of ducts includes (i) a third duct at or near the mirror head and (ii) a fourth duct at or near the mirror head.

5. The vehicular windshield electronics module of claim 1, wherein the electrically operable fan is mounted at or near the front portion of the housing.

6. The vehicular windshield electronics module of claim 5, wherein the electrically operable fan, when electrically operated to generate the cooling air flow, draws the air flow into the front portion of the housing via a respective duct of the plurality of ducts and toward the camera so that the cooling air flow moves from the front portion of the housing toward the rear portion of the housing.

7. The vehicular windshield electronics module of claim 5, wherein the electrically operable fan, when electrically operated to generate the cooling air flow, draws the air flow from within the front portion of the housing and expels the air flow outward from the front portion of the housing via a respective duct of the plurality of ducts so that the cooling air flow moves from the rear portion of the housing toward the front portion of the housing.

8. The vehicular windshield electronics module of claim 1, wherein the electrically operable fan is mounted at or near the rear portion of the housing.

9. The vehicular windshield electronics module of claim 8, wherein the electrically operable fan, when electrically operated to generate the cooling air flow, draws the air flow into the rear portion of the housing via a respective duct of the plurality of ducts and toward the electronic circuitry at the rear portion of the housing so that the cooling air flow moves from the rear portion of the housing toward the front portion of the housing.

10. The vehicular windshield electronics module of claim 8, wherein the electrically operable fan, when electrically operated to generate the cooling air flow, draws the air flow from within the rear portion of the housing and expels the air flow outward from the rear portion of the housing via a respective duct of the plurality of ducts so that the cooling air flow moves from the front portion of the housing toward the rear portion of the housing.

11. The vehicular windshield electronics module of claim 1, wherein the plurality of ducts includes (i) a first duct at the front portion of the housing, (ii) a second duct at the rear portion of the housing, (iii) a third duct at or near the mirror head and between the first duct and the second duct and (iv) a fourth duct at or near the mirror head and between the third duct and the second duct.

12. The vehicular windshield electronics module of claim 11, wherein the electrically operable fan is mounted at the front portion of the housing at the first duct, and wherein one selected from the group consisting of (i) the electrically operable fan, when electrically operated to generate the cooling air flow, draws the air flow into the front portion of the housing via the first duct and toward the camera so that the cooling air flow moves from the front portion of the housing toward the second duct, the third duct, the fourth duct and the rear portion of the housing and (ii) the electrically operable fan, when electrically operated to generate the cooling air flow, draws the air flow from within the front portion of the housing and expels the air flow outward from the front portion of the housing via the first duct so that the cooling air flow moves from the rear portion of the housing, the second duct, the third duct and the fourth duct toward the front portion of the housing.

13. The vehicular windshield electronics module of claim 11, wherein the electrically operable fan is mounted at the rear portion of the housing at the second duct, and wherein one selected from the group consisting of (i) the electrically operable fan, when electrically operated to generate the cooling air flow, draws the air flow into the rear portion of the housing via the second duct and toward the electronic circuitry at the rear portion of the housing so that the cooling air flow moves from the rear portion of the housing toward the first duct, the third duct, the fourth duct and the front portion of the housing and (ii) the electrically operable fan, when electrically operated to generate the cooling air flow, draws the air flow from within the rear portion of the housing and expels the air flow outward from the rear portion of the housing via the second duct so that the cooling air flow moves from the front portion of the housing, the first duct, the third duct and the fourth duct toward the rear portion of the housing.

14. The vehicular windshield electronics module of claim 1, wherein the at least one heat generating electronic component of the interior rearview mirror assembly comprises an in-cabin monitoring camera that views through a mirror reflective element of the interior rearview mirror assembly.

15. The vehicular windshield electronics module of claim 1, wherein the at least one heat generating electronic component of the interior rearview mirror assembly comprises a video display screen disposed at the mirror head.

16. The vehicular windshield electronics module of claim 1, wherein the at least one heat generating electronic component of the electronic circuitry at the rear portion of the housing comprises a light source that, when electrically operated to emit light, illuminates at least a portion of an interior cabin of the vehicle.

17. A vehicular windshield electronics module, the vehicular windshield electronics module comprising:
  a housing configured to attach at an interior portion of a vehicle equipped with the vehicular windshield electronics module, wherein the housing accommodates a camera, and wherein, with the housing attached at the interior portion of the vehicle, the housing includes a front portion extending partially along an in-cabin side of an upper region of a windshield of the vehicle and a rear portion rearward of the front portion and extending partially along a roof portion of an interior cabin of the vehicle;
  wherein the camera is disposed at the front portion of the housing and, with the housing attached at the interior portion of the vehicle, views forward of the vehicle through the upper region of the windshield of the vehicle, and wherein the camera, when operated to capture image data, generates heat within the housing;
  wherein electronic circuitry is disposed at the rear portion of the housing, and wherein the electronic circuitry comprises at least one heat generating electronic component that, when electrically operated, generates heat within the housing;
  an interior rearview mirror assembly disposed at the housing, the interior rearview mirror assembly comprising a mirror head;
  wherein the interior rearview mirror assembly comprises at least one heat generating electronic component that, when electrically operated, generates heat within the mirror head;
  wherein the housing comprises a plurality of ducts, and wherein the plurality of ducts includes (i) a first duct at the front portion of the housing, (ii) a second duct at the rear portion of the housing, and (iii) a third duct between the first duct and the second duct;
  wherein the mirror head is disposed at the housing between the first duct and the second duct, and wherein at least the third duct is disposed at or near the mirror head;
  an electrically operable fan that, when electrically operated, generates cooling air flow within the housing, wherein the air flow passes into the housing and out from the housing via respective ducts of the plurality of ducts;
  wherein, when the electrically operable fan is electrically operated to generate the cooling air flow, air flow passes (i) along the camera at the front portion of the housing to dissipate heat generated by the camera, (ii) along the electronic circuitry at the rear portion of the housing to dissipate heat generated by the at least one heat generating electronic component of the electronic circuitry and (iii) along the mirror head to dissipate heat generated by the at least one heat generating electronic component of the interior rearview mirror assembly; and
  wherein the electrically operable fan is mounted at the front portion of the housing at the first duct, and wherein one selected from the group consisting of (i) the electrically operable fan, when electrically operated to generate the cooling air flow, draws the air flow into the front portion of the housing via the first duct so that the cooling air flow moves from the front portion of the housing toward the third duct and toward the second duct at the rear portion of the housing, and (ii) the electrically operable fan, when electrically operated to generate the cooling air flow, draws the air flow from within the housing and expels the air flow outward from the front portion of the housing via the first duct so that the cooling air flow moves from the second duct at the rear portion of the housing toward the third duct and toward the front portion of the housing.

18. The vehicular windshield electronics module of claim 17, wherein the plurality of ducts comprises a fourth duct between the first duct and the third duct, and wherein the electrically operable fan, when electrically operated to generate the cooling air flow, draws the air flow from within the housing so that the cooling air flows (i) into the housing via the second duct, (ii) outward from the housing via the third duct at the mirror head, (iii) into the housing via the fourth duct and (iv) outward from the housing via the first duct at the front portion of the housing.

19. The vehicular windshield electronics module of claim 17, wherein the plurality of ducts comprises a fourth duct between the second duct and the third duct, and wherein the electrically operable fan, when electrically operated to generate the cooling air flow, draws the air flow into the housing via the first duct and toward the rear portion of the housing so that the cooling air flows (i) into the housing via the first duct, (ii) outward from the housing via the third duct, (iii) into the housing via the fourth duct and (iv) outward from the housing via the second duct at the rear portion of the housing.

20. The vehicular windshield electronics module of claim 17, wherein the at least one heat generating electronic component of the interior rearview mirror assembly comprises an in-cabin monitoring camera that views through a mirror reflective element of the interior rearview mirror assembly.

21. The vehicular windshield electronics module of claim 17, wherein the at least one heat generating electronic component of the interior rearview mirror assembly comprises a video display screen disposed at the mirror head.

22. The vehicular windshield electronics module of claim 17, wherein the at least one heat generating electronic component of the electronic circuitry at the rear portion of the housing comprises a light source that, when electrically operated to emit light, illuminates at least a portion of an interior cabin of the vehicle.

23. A vehicular windshield electronics module, the vehicular windshield electronics module comprising:

a housing configured to attach at an interior portion of a vehicle equipped with the vehicular windshield electronics module, wherein the housing accommodates a camera, and wherein, with the housing attached at the interior portion of the vehicle, the housing includes a front portion extending partially along an in-cabin side of an upper region of a windshield of the vehicle and a rear portion rearward of the front portion and extending partially along a roof portion of an interior cabin of the vehicle;

wherein the camera is disposed at the front portion of the housing and, with the housing attached at the interior portion of the vehicle, views forward of the vehicle through the upper region of the windshield of the vehicle, and wherein the camera, when operated to capture image data, generates heat within the housing;

wherein electronic circuitry is disposed at the rear portion of the housing, and wherein the electronic circuitry comprises at least one heat generating electronic component that, when electrically operated, generates heat within the housing;

an interior rearview mirror assembly disposed at the housing, the interior rearview mirror assembly comprising a mirror head;

wherein the interior rearview mirror assembly comprises at least one heat generating electronic component that, when electrically operated, generates heat within the mirror head;

wherein the housing comprises a plurality of ducts, and wherein the plurality of ducts includes (i) a first duct at the front portion of the housing, (ii) a second duct at the rear portion of the housing and (iii) a third duct between the first duct and the second duct;

wherein the mirror head is disposed at the housing between the first duct and the second duct, and wherein at least the third duct is disposed at or near the mirror head;

an electrically operable fan that, when electrically operated, generates cooling air flow within the housing, wherein the air flow passes into the housing and out from the housing via respective ducts of the plurality of ducts;

wherein, when the electrically operable fan is electrically operated to generate the cooling air flow, air flow passes (i) along the camera at the front portion of the housing to dissipate heat generated by the camera, (ii) along the electronic circuitry at the rear portion of the housing to dissipate heat generated by the at least one heat generating electronic component of the electronic circuitry and (iii) along the mirror head to dissipate heat generated by the at least one heat generating electronic component of the interior rearview mirror assembly; and wherein the electrically operable fan is mounted at the rear portion of the housing at the second duct, and wherein one selected from the group consisting of (i) the electrically operable fan, when electrically operated to generate the cooling air flow, draws the air flow into the rear portion of the housing via the second duct and toward the front portion of the housing so that the cooling air flow moves from the rear portion of the housing toward the third duct and toward the first duct at the front portion of the housing, and (ii) the electrically operable fan, when electrically operated to generate the cooling air flow, draws the air flow from within the housing and expels the air flow outward from the rear portion of the housing via the second duct so that the cooling air flow moves from the first duct at the front portion of the housing toward the third duct and toward the rear portion of the housing.

24. The vehicular windshield electronics module of claim 23, wherein the plurality of ducts comprises a fourth duct between the second duct and the third duct, and wherein the electrically operable fan, when electrically operated to generate the cooling air flow, draws the air flow from within the housing and toward the rear portion of the housing so that the cooling air flows (i) into the housing via the first duct, (ii) outward from the housing via the third duct at the mirror head, (iii) into the housing via the fourth duct and (iv) outward from the housing via the second duct at the rear portion of the housing.

25. The vehicular windshield electronics module of claim 23, wherein the plurality of ducts comprises a fourth duct between the first duct and the third duct, and wherein the electrically operable fan, when electrically operated to generate the cooling air flow, draws the air flow into the housing via the second duct and toward the front portion of the housing so that the cooling air flows (i) into the housing via the second duct, (ii) outward from the housing via the third duct, (iii) into the housing via the fourth duct and (iv) outward from the housing via the first duct at the front portion of the housing.

26. The vehicular windshield electronics module of claim 23, wherein the at least one heat generating electronic component of the interior rearview mirror assembly comprises an in-cabin monitoring camera that views through a mirror reflective element of the interior rearview mirror assembly.

27. The vehicular windshield electronics module of claim 23, wherein the at least one heat generating electronic component of the interior rearview mirror assembly comprises a video display screen disposed at the mirror head.

28. The vehicular windshield electronics module of claim 23, wherein the at least one heat generating electronic component of the electronic circuitry at the rear portion of the housing comprises a light source that, when electrically operated to emit light, illuminates at least a portion of an interior cabin of the vehicle.

* * * * *

UNITED STATES PATENT AND TRADEMARK OFFICE
CERTIFICATE OF CORRECTION

| | | |
|---|---|---|
| PATENT NO. | : 11,833,972 B1 | Page 1 of 1 |
| APPLICATION NO. | : 18/315594 | |
| DATED | : December 5, 2023 | |
| INVENTOR(S) | : Martin Solar et al. | |

It is certified that error appears in the above-identified patent and that said Letters Patent is hereby corrected as shown below:

In the Specification

<u>Column 8</u>
Line 45, "7,859,565; 5,670,935;" should be --7,859,565; 5,550,677; 5,670,935;--
Lines 47-48, "and/or and/or U.S. Publication Nos." should be --and/or 5,786,772, and/or U.S. Publication Nos.--

Signed and Sealed this
Second Day of January, 2024

*Katherine Kelly Vidal*

Katherine Kelly Vidal
*Director of the United States Patent and Trademark Office*